(12) United States Patent
Anders et al.

(10) Patent No.: US 11,524,440 B2
(45) Date of Patent: Dec. 13, 2022

(54) APPARATUS AND METHOD FOR ERECTING A PLASTICS PROFILE DURING EXTRUSION

(71) Applicant: GREINER EXTRUSION GROUP GMBH, Nussbach (AT)

(72) Inventors: Gerhard Anders, Ried (AT); Karl Gebesmaier, Kirchdorf/Krems (AT); Erwin Krumböck, Ansfelden (AT); Jürgen Kock, Kirchdorf/Krems (AT)

(73) Assignee: GREINER EXTRUSION GROUP GMBH, Nussbach (AT)

( * ) Notice: Subject to any disclaimer, the term of this patent is extended or adjusted under 35 U.S.C. 154(b) by 38 days.

(21) Appl. No.: 16/766,640

(22) PCT Filed: Nov. 26, 2018

(86) PCT No.: PCT/EP2018/082536
§ 371 (c)(1),
(2) Date: May 22, 2020

(87) PCT Pub. No.: WO2019/101992
PCT Pub. Date: May 31, 2019

(65) Prior Publication Data
US 2020/0368957 A1 Nov. 26, 2020

(30) Foreign Application Priority Data
Nov. 24, 2017 (DE) ..................... 10 2017 221 031.1

(51) Int. Cl.
*B29C 48/90* (2019.01)
*B29C 48/09* (2019.01)
(Continued)

(52) U.S. Cl.
CPC ............ *B29C 48/903* (2019.02); *B29C 48/09* (2019.02); *B29C 48/12* (2019.02); *B29C 48/355* (2019.02)

(58) Field of Classification Search
CPC ....... B29C 48/09; B29C 48/12; B29C 48/903; B29C 48/90; B29C 48/355
See application file for complete search history.

(56) References Cited

U.S. PATENT DOCUMENTS

| 1,766,638 A | 6/1930 | Howard |
| 4,187,068 A | 2/1980 | Vassar |
(Continued)

FOREIGN PATENT DOCUMENTS

| DE | 2412818 A1 | 9/1975 |
| DE | 3230746 A1 | 2/1984 |
(Continued)

*Primary Examiner* — Seyed Masoud Malekzadeh
(74) *Attorney, Agent, or Firm* — Maschoff Brennan (57) ABSTRACT

It is provided an apparatus for supporting the erection of a plastics profile during the start-up process of an extrusion line for the extrusion of plastics profiles. An initially bulky profile strand of the plastics profile, which is withdrawn through a calibration unit, can be enclosed by a profile guiding trim of a profile guiding device in front of a caterpillar take-off, wherein the profile guiding trim and/or the profile guiding device can be spatially fixed against a displacement in the extrusion direction in front of an inlet region into the caterpillar take-off and can be shifted and fixed with regard to the vertical and/or lateral position and/or can be rotated about the extrusion direction and be fixed.

16 Claims, 5 Drawing Sheets

(51) Int. Cl.
*B29C 48/355* (2019.01)
*B29C 48/12* (2019.01)

(56) References Cited

U.S. PATENT DOCUMENTS

| | | | | |
|---|---|---|---|---|
| 8,607,610 B2* | 12/2013 | Klever | ................... | B29C 48/09 |
| | | | | 29/559 |
| 8,632,868 B2* | 1/2014 | Melkonian | .............. | B29C 48/38 |
| | | | | 52/204.5 |
| 9,579,839 B2* | 2/2017 | Kenny | .................. | B29C 48/914 |
| 9,802,329 B2* | 10/2017 | Droege | .............. | B29C 48/0022 |
| 9,981,415 B2* | 5/2018 | Kenny | .................. | B29C 48/154 |
| 10,350,807 B2* | 7/2019 | Kenny | .................. | B29C 48/34 |
| 10,500,779 B2 | 12/2019 | Fischer et al. | | |
| 10,940,625 B2* | 3/2021 | Kenny | .................. | B29C 48/156 |
| 2005/0067729 A1* | 3/2005 | Laver | ........................ | B27N 3/28 |
| | | | | 264/45.9 |
| 2006/0145389 A1* | 7/2006 | Schwaiger | .............. | B29C 48/90 |
| | | | | 425/326.1 |
| 2010/0283173 A1* | 11/2010 | Kenny | .................... | B29C 48/90 |
| | | | | 264/171.13 |
| 2010/0300172 A1* | 12/2010 | Klever | .................... | B29C 48/92 |
| | | | | 29/559 |
| 2011/0120034 A1* | 5/2011 | Melkonian | .......... | B29C 48/2886 |
| | | | | 52/204.5 |
| 2011/0274923 A1* | 11/2011 | Hartmann | ............. | B29C 48/903 |
| | | | | 425/66 |
| 2012/0261051 A1* | 10/2012 | Visscher | ................. | B29C 48/91 |
| | | | | 156/64 |
| 2012/0321734 A1* | 12/2012 | Kenny | .................. | B29C 48/916 |
| | | | | 425/113 |
| 2014/0109498 A1* | 4/2014 | Melkonian | ............... | B29C 48/21 |
| | | | | 52/204.5 |
| 2015/0283750 A1* | 10/2015 | Kenny | .................. | B29C 48/916 |
| | | | | 425/71 |
| 2016/0243712 A1* | 8/2016 | Dröge | .................... | B29C 48/09 |
| 2017/0037673 A1* | 2/2017 | Melkonian | ............ | B29C 48/395 |
| 2018/0111304 A1* | 4/2018 | Kenny | .................... | B29C 48/08 |
| 2018/0361646 A1* | 12/2018 | Dohmann | ................ | B29C 48/06 |

FOREIGN PATENT DOCUMENTS

| | | | |
|---|---|---|---|
| DE | 102005010808 A1 * | 6/2006 | ............. B29C 53/20 |
| DE | 102005003860 A1 | 8/2006 | |
| DE | 102013209703 A1 | 11/2014 | |
| EP | 0425942 A2 | 5/1991 | |
| WO | 2010084094 A2 | 7/2010 | |

* cited by examiner

APPARATUS AND METHOD FOR ERECTING A PLASTICS PROFILE DURING EXTRUSION

CROSS-REFERENCE TO A RELATED APPLICATION

This application is a National Phase patent application of International Patent Application Number PCT/EP2018/082536, filed on Nov. 26, 2018, which claims priority of German Patent Application Number 10 2017 221 031.1, filed on Nov. 24, 2017.

BACKGROUND

The disclosure relates to an apparatus and to a method for erecting a plastics profile during the extrusion of plastics profiles.

Plastics profiles made of PVC and other materials frequently are produced by extrusion. In the extruder, a largely homogeneous plastic melt is processed and brought to a pressure of about 200 to 400 bar and to a temperature of about 190° C. The plastic melt is pressed through an extrusion die at high pressure. At the outlet of the extrusion die the plastic melt approximately has the contour of the desired plastics profile.

After the extrusion die, the melt strand passes through a calibration in order to be cooled in the same by maintaining the profile contour. Calibration devices for the manufacture of comparatively complicated plastics profiles, such as e.g. window profiles, usually include a dry calibration zone and an adjoining wet calibration zone.

The dry calibration includes at least one calibrator block. In the at least one calibrator block, the still soft plastic material of the extruded plastics profile is sucked against the wall close to the profile by means of an applied negative pressure. The heat gets from the plastics profile into the calibration device. Cooling of the calibration device is effected by cold water which is guided through cooling channels in the vicinity of the walls.

The wet calibration usually includes at least one vacuum tank, wherein in the case of a plurality of vacuum tanks the same are arranged one behind the other. In the vacuum tanks, cooling water is in direct contact with the extruded plastics profile. As on entry into the wet calibration the plastics profile still is deformable, calibration trims or further, simplified calibrator blocks also are arranged within the at least one vacuum tank in order to support the plastics profile, until it cools down and reaches a dimensionally stable state, and to keep it in shape. When the plastics profile has cooled down in its interior to about 30 to 50° C., a dimensionally stable state exists in general and no further support and cooling in a vacuum tank is required.

After the wet calibration, the plastics profile gets into a profile take-off and subsequently to a cross-cutting saw. The cross-cut plastics profiles are cooled in air to room temperature and are stored on pallets until further processing.

Before profiles can be extruded in a continuous operation, the entire extrusion apparatus, i.e. the extrusion line, must be started, which comprises all processes from the set-up of the extrusion die and the calibration, preheating of the extruder, driving the extruder worms until the desired throughput is reached, drawing in the plastics profile so that the melt strand extends away from the extrusion die within the calibration and is seized by the caterpillar take-off, erecting the plastics profile so that the hollow chambers are formed, etc., until the plastics profile has the desired geometry.

After the start-up of the plant, the actual production of the plastics profiles begins.

SUMMARY

The disclosure relates to an apparatus and a method for erecting the profile in the caterpillar take-off unit. The comparatively complex procedure for erecting the profile will be simplified.

The object is achieved by an apparatus with features as described herein.

The initially bulky profile strand of the plastics profile withdrawn through a calibration can be enclosed by a profile guiding trim of a profile guiding device in front of a caterpillar take-off, which provides hold to the plastics profile for its alignment. A profile guiding trim as part of the profile guiding device and/or the profile guiding device itself can be spatially fixed against a displacement in the extrusion direction in front of an inlet area into the caterpillar take-off and can be shifted and fixed with respect to the vertical and/or lateral position and can be rotated and/or fixed about the extrusion direction.

In one embodiment, the profile guiding trim can include an opening which is adapted to the outer contour of the plastics profile, wherein in essence the contour of the opening is spaced apart from the contour of the plastics profile with an offset. Thus, the plastics profile has some clearance in the opening. The offset can be e.g. 1 to 2 mm.

For a better introducability of the plastics profile into the profile guiding trim an inlet slope in one embodiment is arranged at the opening of the profile guiding trim. The same for example can have a length of 8 to 20 mm and/or an angle of 10 to 30 degrees with respect to the extrusion axis.

The handling of the profile guiding trim is facilitated when in one embodiment the same is of multipart design, in particular of two-part design. Thus, the same can be put onto the profile strand passing there through and can also be removed again. In one embodiment, the parts of the profile guiding trim can be positively connectable with each other, in particular via at least one dovetail connection and/or via at least one spring and groove.

For the case that a plastics profile includes grooves, the opening in one embodiment is generously relieved in the vicinity of the groove or the grooves are disregarded in that the guiding contour of the opening does not protrude into the grooves of the plastics profile.

In another embodiment, the profile guiding trim is received by a holding device which permits the required linear and/or rotatory degrees of freedom and inhibits further degrees of freedom. The profile guiding trim for example can be rotated or moved in only one plane which is perpendicular to the direction of extrusion.

Furthermore, the profile guiding trim can be rotatable, wherein the angular position can be fixed discretely, i.e. incrementally, in particular by an arresting device, particularly by a pawl device.

Alternatively or in addition, it is possible that the holding device for the profile guiding trim is vertically shiftably and fixably mounted and is horizontally shiftably and fixably mounted transversely to the direction of extrusion on a supporting rail attached to the caterpillar take-off.

Furthermore, at least one insert made of a wear-resistant material can be arranged in regions of the profile guiding trim exposed to great loads.

The object also is achieved by a method with features as described herein.

BRIEF DESCRIPTION OF THE DRAWINGS

By means of exemplary embodiments, the apparatus and its operation will be described with reference to Figures.

DETAILED DESCRIPTION

Figure 1:
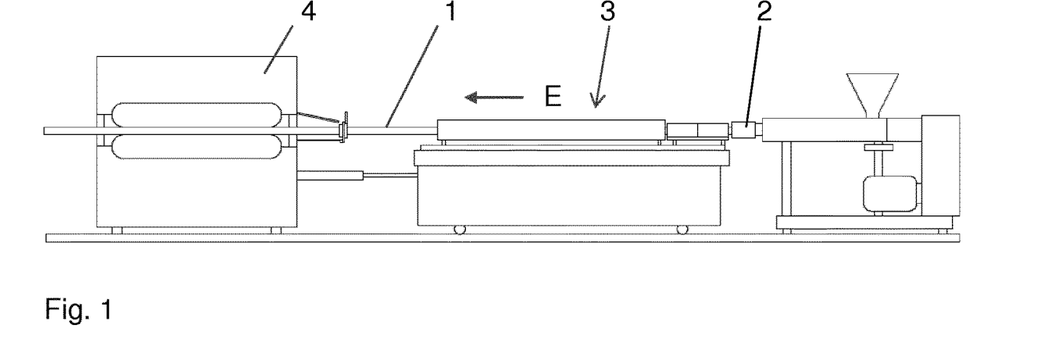
FIG. 1 shows an embodiment of an extrusion system known per se for the extrusion of plastics profiles.

The embodiments described here relate to the profile guiding device for erecting a plastics profile 1 during the start-up process of an extrusion system, which in principle is shown in FIG. 1.

In the following, the start-up process known per se will be described with reference to FIG. 1. The start-up process with an embodiment of the apparatus according to the solution will be described later, and the same differs from the conventional start-up process only with regard to the erection of the profile.

On start-up of the extrusion line, the melt initially exits from the extrusion die 2 without a particular contour and viscously flows to the ground. After exit from the extrusion die 2, the melt, i.e. the future profile strand, then is seized by means of a cord loop and drawn through the entire calibration 3 by means of an auxiliary profile, the strand being cooled continuously. Only when the profile strand has reached a caterpillar take-off 4 and thus allows taking over larger withdrawal forces, the so-called erection of the plastics profile 1 begins.

Initially, negative pressure is applied to the dry calibration zones and thereafter the hollow chambers of the plastics profile are pierced at the die outlet. As soon as air can enter into the hollow chambers, the same are gradually formed.

Only when the hollow chambers have separately passed through the entire calibration 3 including the area of the caterpillar take-off 4 and have cross-sections open at the cut surface after the strand is cut to length in the saw, enough air enters the hollow chambers against the extrusion direction E, and the plastics profile 1 gradually forms the outer contour. From this time, the plastics profile 1 leaves the calibration 3 with a cross-section approximately corresponding to the desired cross-section, but the same is largely destroyed again by the pressing force in the caterpillar take-off 4, i.e. the plastics profile is compressed and frequently also rotated about the longitudinal axis in a particular direction.

The final erection of the plastics profile 1 in the caterpillar take-off 4 requires considerable skills on the part of the operating personnel. Short pieces of wood often are added in the immediate vicinity of the plastics profile 1, which effect that the caterpillar take-off is forced to the desired profile height against the set pressing force so that the plastics profile 1 has more space available and can form perpendicular, planar walls which then can withstand the contact pressure. The insertion and removal of these pieces of wood only can be effected with open safety doors. As soon as the plastics profile 1 is not crushed directly in the feed zone of the pair of caterpillars, but is withdrawn in the upright position along a length of more than one meter, there is a good chance that a stable state is obtained therefrom and henceforth the plastics profile 1 can be withdrawn without being crushed.

When the plastics profile 1 in addition is also rotated about the longitudinal axis, the operator is forced to briefly exert a counter-rotation onto the plastics profile 1 in the short section between the end of the calibration 3 and the caterpillar take-off unit 4, wherein screw clamps and wooden strips are used as a makeshift and from case to case the safety tunnel also is opened as a finger guard.

In total, the erection of the profile in a conventional way requires a collaboration of several operators and particular skills.

The objective of the embodiments is to simplify the profile erection with special attention to the safety aspects.

Figure 2:
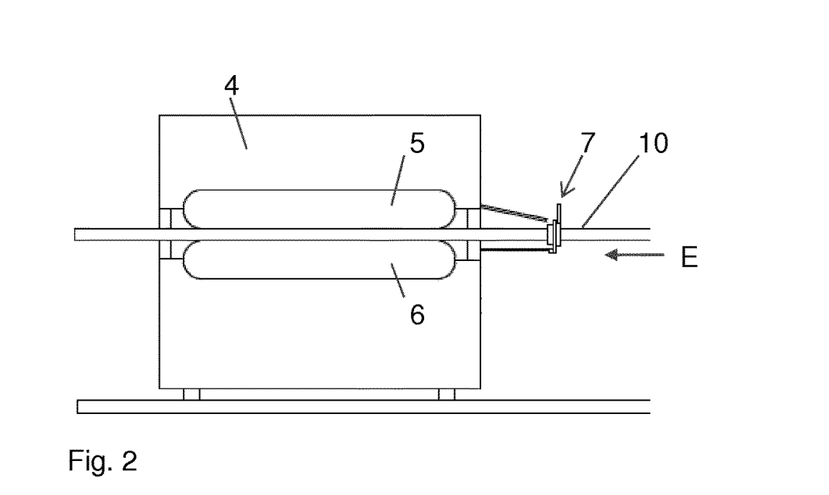
FIG. 2 shows a detail representation of a caterpillar take-off unit of an extrusion system with a profile guiding device for erecting the plastics profile.

FIG. 2 shows the two caterpillars 5, 6 of the caterpillar take-off unit 4, which withdraw the plastics profile 1 in the extrusion direction E from the right to the left. On the inlet side a finger guard 7 is arranged, which is an important safety device that prevents operators from reaching into the operating area of the caterpillars with their hands. In front of the finger guard 7, relative to the extrusion direction E, the profile guiding device 10 is arranged. Here, the same is stationarily connected to the caterpillar take-off 4. Shortly before the finger guard 7 a supporting rail 16 is mounted, which carries the holding device 12 for the profile guiding trim 12 (see FIG. 3).

FIG. 2 shows an overview of the entire profile guiding device 10 in a side view, which profile guiding device accommodates a profile guiding trim 13 that constitutes the central element of the device. The profile guiding trim 13 thus is arranged on the inlet side in front of the safety tunnel of the caterpillar take-off 4 in a manner protected against inadvertently reaching into the caterpillar section, see the caterpillars 5 and 6, stationary in the extrusion direction E, but laterally and/or vertically shiftable and rotatable about the extrusion axis E. In the following, details of the profile guiding device 10 will be set forth. With the exception of the profile guiding trim 13, the profile guiding device 10 can be part of the caterpillar take-off 4 and can be used for different plastics profiles 1, i.e. for different profile guiding trims 13.

Figure 3:
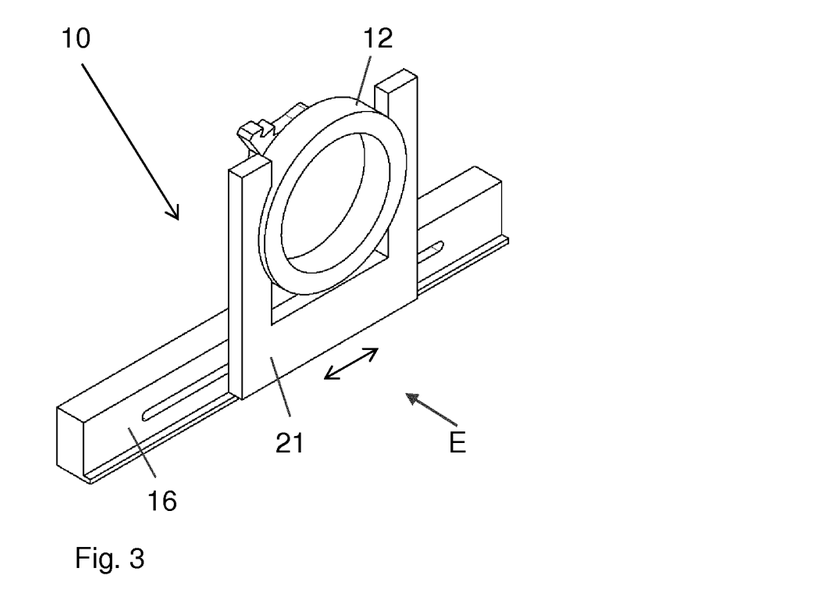
FIG. 3 shows a representation of an embodiment of a profile guiding device, but without a profile guiding trim.

FIG. 3 shows a profile guiding device 10, consisting of a supporting rail 16, a receiving plate 21 and a holding device 12 for the profile guiding trim 13. Here, the profile guiding trim 13 is not installed yet. The supporting rail 16 is attached to the caterpillar take-off 4 in front of the finger guard 7. On said supporting rail a receiving plate 21 for the holding device 12 is mounted, which is shiftable and fixable in the transverse direction (double arrow). The holding device 12 is configured as a vertically shiftable and fixable receiving ring for the profile guiding trim 13 (not shown in FIG. 3).

Figure 4:
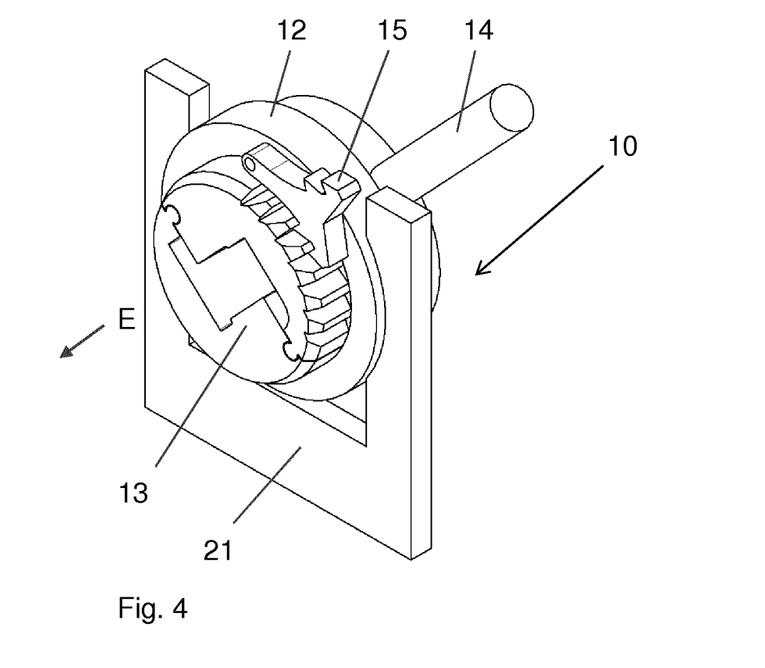
FIG. 4 shows an embodiment of a profile guiding trim in a holding device.

FIG. 4 shows a receiving plate 21 together with a holding device 12 and a profile guiding trim 13 in an oblique view against the extrusion direction E. It can be seen that the angular adjustment can be performed by means of a lever 14. An arresting device 15, here configured as a pawl device, provides a possibility for fixing the angular position. The movement of the lever 14 can be performed by an operator or by a control device not shown here. The holding device 12 is vertically shiftably and/or fixably mounted in the receiving plate 21.

The pawl and the teeth in the profile guiding trim 13 are designed such that proceeding from the expected starting position a plurality of angular positions are covered with a correctly erected plastics profile 1 over a plurality of intermediate stages up to the end position, and during the erection the plastics profile 1 is prevented from tilting back into the starting position. When the pawl is lifted, all angular positions can be set manually. The pawl can be used for both directions of erection by being locked in place either, as shown, on the operating side of the extrusion line or on the opposite side.

Figure 5:
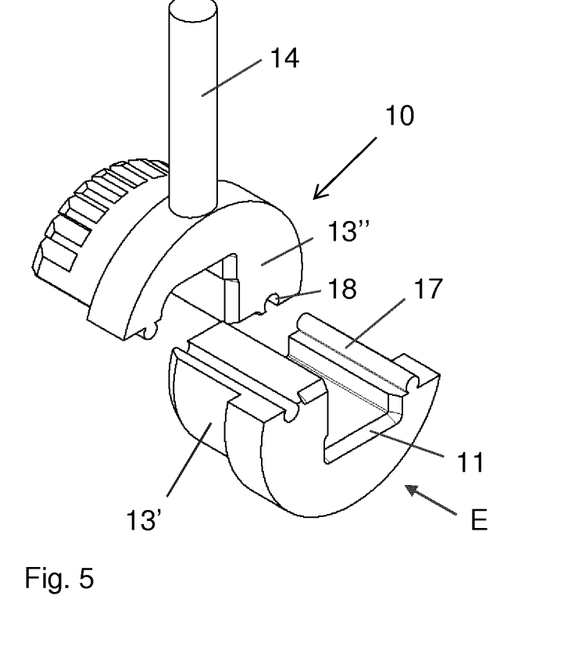
FIG. 5 shows a perspective view of an embodiment of a two-part profile guiding trim comprising a lever for angular adjustment.

FIG. 5 shows an embodiment of a profile guiding trim 13. A two-part or multipart design (lower part 13', upper part 13") is to be preferred so as to be able to mount the profile guiding trim 13 also after loading the plastics profile 1 and to be able to remove the same again after successfully erecting the plastics profile 1. The individual parts 13', 13" include a holding system comprising spring 17 and groove 18 in the dividing surfaces, which cooperate similar to a dovetail guide. The two parts 13', 13" are guided around the initially bulkily compressed plastics profile 1 (not shown here) and are loosely joined by telescoping in the extrusion direction E and pushed into the holding device 12. After the two parts 13', 13" rest against the receiving ring of the holding device 12 with their integrally molded collar, they are sufficiently connected to each other in order to effect the rotation of the plastics profile in the process of erection.

The profile guiding trim 10 can be manufactured from any metal, but a type made of plastics also is possible. In the latter case, a 3D printing method is advantageous, because by this method comparatively complicated components can be manufactured at low cost. For the angular adjustment, the lever 14 can also be integrally molded to a part of the profile guiding trim 13". By the 3D printing method, the strength is sufficiently high and the dimensional accuracy is enough to be able to fulfill the requirements for the erection of the profile during harsh environmental conditions in an extrusion mode over several years.

In the inlet area of the profile guiding trim inlet slopes 11 are arranged on the circumference.

Figure 6:
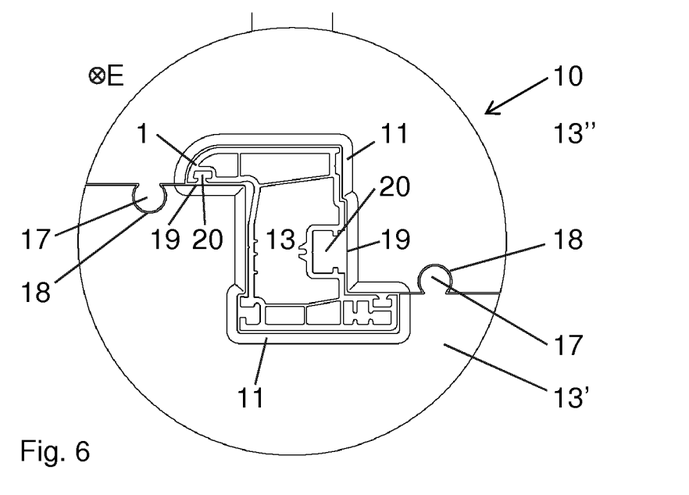
FIG. 6 shows a top view of the embodiment according FIG. 5 in the direction of extrusion.

FIG. 6 shows the profile guiding trim 13 of FIG. 5 with the plastics profile 1 (here a wing profile) guided through an opening 19 with a view in the extrusion direction E. The plastics profile 1 is fully formed.

The contour of the opening 19 in the profile guiding trim 13 must correlate with that of the plastics profile 1 only at few prominent surfaces or outer corners in order to on the one hand provide for rotating the plastics profile 1 on erection with a moderate expenditure of force and on the other hand prevent the plastics profile from getting caught in the case of major contour deviations during the start-up and erecting process.

This profile guiding trim 13 includes major relieves as compared to the cooling trims of the calibration 3, wherein only the prominent outer contour of the plastics profile 1 is taken into account and in particular groove areas 20 of the plastics profile 1 are not depicted. Circumferentially around the plastics profile 1 a gap having a width of about 1 mm is left blank, and in the case of grooves of the plastics profile 1 the contour of the opening 19 does not follow the groove contour at all.

In addition, the inlet slope 11 can be seen. The same effects that during the erection of the profile the plastics profile 1 does not get caught upon occurrence of irregularly shaped profile segments protruding from the plastics profile 1 and as a result tears off or the profile guiding trim 13 is damaged.

The inlet slopes 11 sometimes can also have a certain spin, i.e. can sectionally be configured longer and deeper. Some plastic profiles 1 distinctly unsymmetrical with respect to a horizontal plane, such as e.g. wing profiles for a flush-mounted design in the case of window profiles, are inclined by approximately 90° in a preferred direction (to the left or right) in the caterpillar inlet region for tilting purposes, wherein the inlet slopes here are configured such that they act against this preferred tilting direction.

Figure 7:
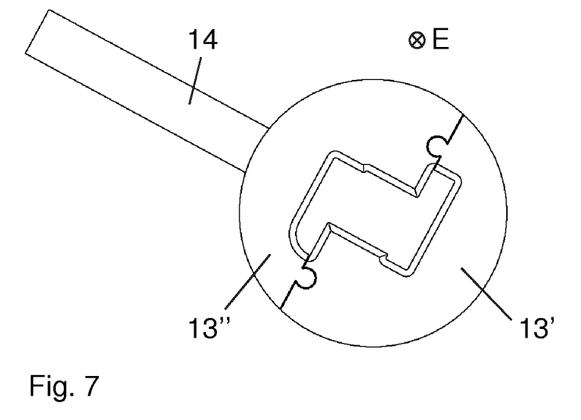
FIG. 7 shows top view of an embodiment of a profile guiding trim in the direction of extrusion.

FIG. 7 shows an embodiment of a two-part profile guiding trim 13', 13". The view is directed in the extrusion direction E. In the concrete case, the same serves to erect a "wing profile", which forms the basis of all Figures. The illustrated orientation corresponds to the initial orientation of the profile guiding trim 13 before the start of the erecting process.

On start-up with the apparatus of the solution, the profile guiding trim 13 now is fixed in the orientation to be expected when the plastics profile 1 gradually forms its hollow chambers. In the concrete case, this orientation corresponds to the orientation as shown in FIG. 7. When loading the plastics profile 1, the profile strand initially is guided through the entire calibration 3 and subsequently through the profile guiding trims 13 and then is withdrawn.

During the gradual formation of the profile shape after piercing the hollow chambers, the plastics profile 1 in many cases "automatically" assumes the intended position, i.e. the plastics profile 1 moves through the caterpillar take-off 4 and previously through the profile guiding trim 13 with hollow chambers formed more or less and in a rotated angular position. If not, the profile guiding trim 13 is rotated by hand, until the same corresponds with the (rotated) position of the plastics profile 1. As soon as the contour of the plastics profile 1 is formed approximately completely and the wall thicknesses, too, already are close to the desired thickness, the plastics profile 1 can be erected completely during the ongoing extrusion by relieving the pressing force of the caterpillars 5, 6 and by rotating the profile guiding trim 13 into the final orientation as shown in FIG. 6.

After the further optimization of the driving parameters and the profile geometry, the start-up process is completed and the extrusion line can resume the normal production operation.

On start-up of the extrusion line a comparatively large pressing force mostly is set in the caterpillar take-off 3 in order to reliably avoid slipping through of the plastics profile 1 at short peaks of the withdrawal force, which inevitably would lead to the plastics profile 1 getting stuck in the calibration 3. Due to this increased pressing force, the plastics profile 1 still is compressed in the inlet region of the caterpillar take-off 4, even if the same possibly already runs correctly through the profile guiding trim 13, i.e. corresponding to the final orientation. To avoid such crushing, the pressing force is reduced successively.

In caterpillar take-off units 4 in which the pressing force is applied via two pneumatic cylinders in the inlet and outlet regions, the inlet-side pressing force is set distinctly smaller than the outlet-side pressing force. By a skillful, coordinated procedure of an operator and by alternately operating the guiding trim as regards lateral and angular positions and by varying the pressing force, the erection of the profile can be terminated successfully within a short time.

The plastics profile 1 then runs through the caterpillar take-off 4 in a correct position and without being crushed. In many cases it even is to be expected that the plastics profile 1 is erected on its own when the starting position of the profile guiding trim 13 has be chosen correctly at the beginning and only the pressing force of the caterpillars is briefly reduced and then set to the desired value. The delicate process of erecting the profile in the caterpillar take-off 3 can be carried out with embodiments of the apparatus without fiddling around in the danger zone in the vicinity of the caterpillar. The expenditure of time is reduced distinctly. Thereafter, the fine adjustment of the profile geometry can be carried out in the usual way.

When using caterpillar take-off units 3 in which the upper caterpillar is mounted in pendulum fashion about a horizontal, transverse axis and the pressing force is applied by lowering this axis, the pressing force in the feed area of the caterpillars cannot be set separately. In this case, the transverse axis is slightly offset to the rear in the extrusion direction with respect to the central position of the caterpillar track so that the force component of the pressing force is smaller in the inlet region than in the outlet region. In this case, too, the total pressing force on erection of the plastics profile 1 is reduced successively, until crushing of the profile is inhibited, which is supported by the point of attack of the pressing force being offset slightly to the rear.

In another embodiment of a caterpillar take-off 3 according to the preceding paragraph, the axis can be configured with a carriage to be advanced obliquely against the extrusion direction so as to gently slope by about 30°, whereby the withdrawal force has a vertical component which is utilized as a pressing force. In this case, a self-locking configuration can be chosen, in which take-off always is effected with a minimum pressing force and the pressing force also is changed "automatically" in the case of fluctuations of the withdrawal force. In this case, the plastics profile 1 almost always is erected "on its own" in the caterpillar take-off 3, as take-off is possible "automatically with a minimum pressing force" without any risk of the plastics profile slipping through, whereby the crushing of the profile is stopped in the simplest way.

This description of the start-up process of an extrusion line for window profiles shows that the sub-step for the erection of the profile can be carried out without utilizing various aids such as the attachment of wooden strips and the removal of the same in the caterpillar take-off area, when the apparatus according to this solution is used. The embodiment allows a safe erection of the plastics profile 1.

Figure 8:
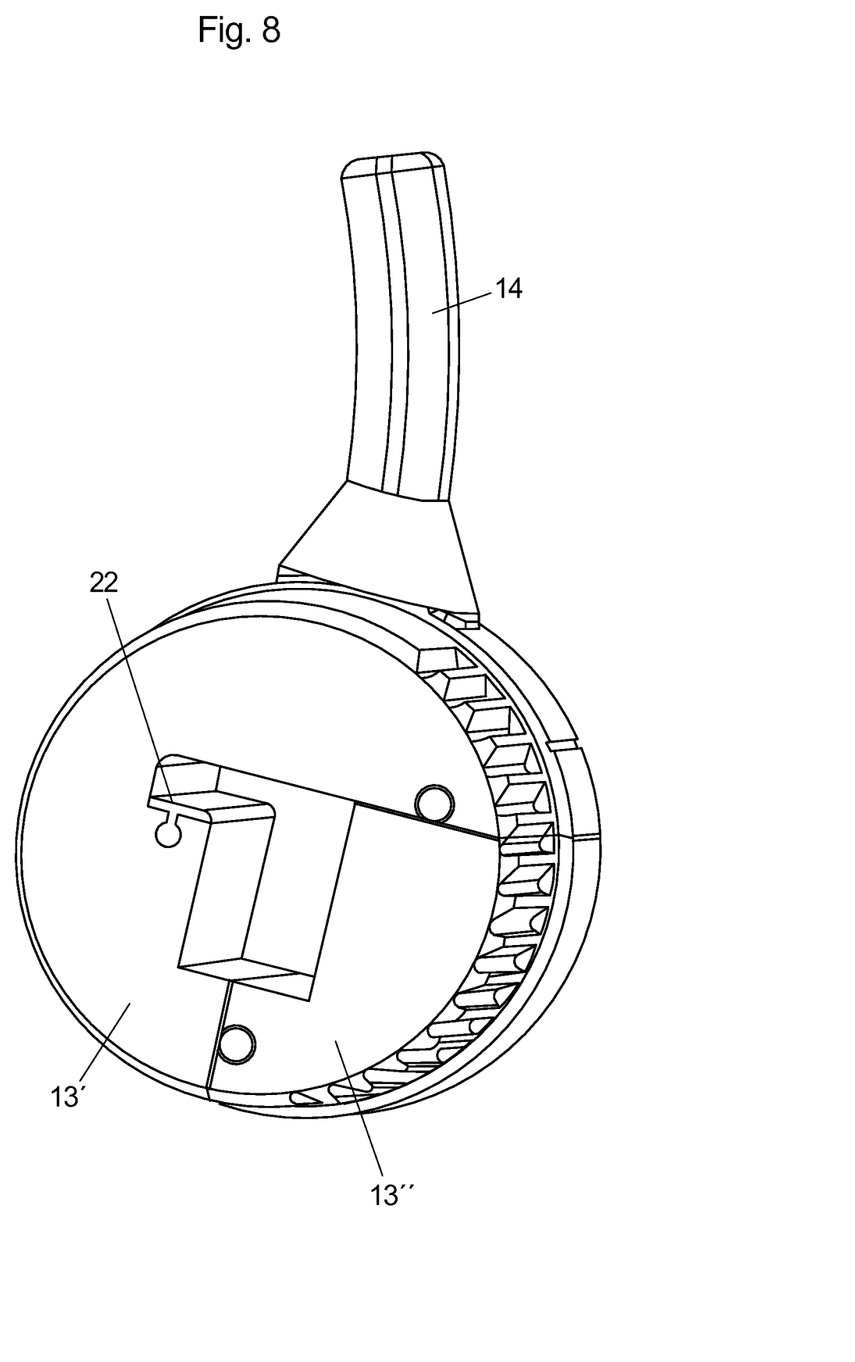
FIG. 8 shows a perspective view of an embodiment of a profile guiding trim comprising an insert made of a wear-resistant material.

FIG. 8 shows a modification of a two-part profile guiding trim 13', 13". Therefore, the relevant parts of the above description can also analogously be transferred to this embodiment.

On the underside of the profile an insert made of wear-resistant material 22 is arranged in the left area, here on an area of the profile guiding trim 13 exposed to great loads. The insert 22 is connected to the lower part of the profile guiding trim 13" via a groove.

In principle, it is also possible to use more than one insert 22 made of wear-resistant material, when another, in particular more complex plastics profile 1 is used.

LIST OF REFERENCE NUMERALS

1 plastics profile
2 extrusion die
3 calibration
4 caterpillar take-off
5 upper caterpillar
6 lower caterpillar
7 finger guard
10 profile guiding device
11 inlet slopes
12 holding device for profile guiding trim
13 profile guiding trim
13' upper part of a profile guiding trim
13" lower part of a profile guiding trim
14 lever for angular adjustment
15 arresting device
16 supporting rail
17 spring
18 groove
19 opening for profile
20 groove area of the profile
21 receiving plate
22 insert made of wear-resistant material
E extrusion direction

The invention claimed is:

1. An apparatus for supporting an erection of a plastic profile during a start-up process of an extrusion line for the extrusion of plastic profiles,
   wherein an initially bulky profile strand of the plastic profile, which is withdrawn through a calibration, can be enclosed by a profile guiding trim of a profile guiding device in front of a caterpillar take-off, wherein one of or both the profile guiding trim or the profile guiding device can be spatially fixed against a displacement in an extrusion direction in front of an inlet region into the caterpillar take-off and can
      be shifted and fixed transversely to the extrusion direction with regard to one of or both the vertical or lateral position and
      be rotated and be fixed about the extrusion direction,
   wherein the profile guiding trim is received by a holding device which permits the profile guiding trim to be shifted with regard to the vertical position and to be rotated about the extrusion direction and inhibits further degrees of freedom and which is vertically shiftably and fixably mounted.

2. The apparatus according to claim 1, wherein the profile guiding trim comprises an opening which is adapted to an outer contour of the plastic profile, wherein a contour of the opening is spaced apart from the outer contour of the plastic profile with an offset.

3. The apparatus according to claim 2, wherein the offset is 1 to 2 mm.

4. The apparatus according to claim 2, wherein at the opening of the profile guiding trim an inlet slope is arranged.

5. The apparatus according to claim 4, wherein the inlet slope has a length of 8 to 20 mm and/or an angle of 10 to 30 degrees with respect to the extrusion axis.

6. The apparatus according to claim 1, wherein the profile guiding trim is of multipart design.

7. The apparatus according to claim 6, wherein the parts of the profile guiding trim can be positively connected to each other.

8. The apparatus according to claim 1, wherein for a contour of the plastic profile comprising grooves, the grooves are disregarded in that a guiding contour of the opening does not protrude into the grooves of the plastic profile.

9. The apparatus according to claim 1, wherein the profile guiding trim is rotatable and an angular position can be fixed discretely.

10. The apparatus according to claim 1, wherein the holding device for the profile guiding trim is horizontally shiftably and fixably mounted on a supporting rail stationarily attached to the caterpillar take-off.

11. The apparatus according to claim 1, wherein at least one insert made of a wear-resistant material is arranged in a region of the profile guiding trim.

12. The apparatus according to claim 1, wherein the plastics profiles comprise hollow chambers.

13. The apparatus according to claim 1, wherein the plastics profiles are window profiles.

14. The apparatus according to claim 7, wherein the parts of the profile guiding trim can be connected to each other via at least one dovetail connection and/or at least one spring and groove.

15. The apparatus according to claim 9, wherein the angular position can be fixed discretely by an arresting device.

16. The apparatus according to claim 10, wherein the angular position can be fixed discretely by a pawl device.

\* \* \* \* \*